United States Patent
Gilbert et al.

(10) Patent No.: US 9,804,741 B2
(45) Date of Patent: Oct. 31, 2017

(54) METHODS AND SYSTEMS FOR MANAGING N-STREAMS OF RECOMMENDATIONS

(71) Applicant: eBay Inc., San Jose, CA (US)

(72) Inventors: Michael Gilbert, Seattle, WA (US); Elizabeth Churchill, San Francisco, CA (US); Kent Andrew Edmonds, San Jose, CA (US); Michael Parker, Santa Cruz, CA (US)

(73) Assignee: EBAY INC., San Jose, CA (US)

( * ) Notice: Subject to any disclaimer, the term of this patent is extended or adjusted under 35 U.S.C. 154(b) by 339 days.

(21) Appl. No.: 14/553,918

(22) Filed: Nov. 25, 2014

(65) Prior Publication Data

US 2016/0147845 A1    May 26, 2016

(51) Int. Cl.
| | | |
|---|---|---|
| *G06F 7/00* | (2006.01) | |
| *G06F 17/30* | (2006.01) | |
| *G06F 3/0482* | (2013.01) | |
| *G06F 3/0484* | (2013.01) | |

(52) U.S. Cl.
CPC ........ *G06F 3/0482* (2013.01); *G06F 3/04842* (2013.01); *G06F 17/30554* (2013.01); *G06F 17/30867* (2013.01)

(58) Field of Classification Search
None
See application file for complete search history.

(56) References Cited

U.S. PATENT DOCUMENTS

| | | | | |
|---|---|---|---|---|
| 2008/0114751 | A1* | 5/2008 | Cramer | G06F 17/30554 |
| 2011/0208730 | A1* | 8/2011 | Jiang | G06F 17/30864 707/727 |
| 2012/0130969 | A1* | 5/2012 | Wong | G06F 17/30867 707/706 |
| 2012/0158685 | A1* | 6/2012 | White | G06F 17/30867 707/706 |
| 2015/0264173 | A1* | 9/2015 | Diana | H04M 3/5191 379/93.02 |

* cited by examiner

*Primary Examiner* — Uyen Le
(74) *Attorney, Agent, or Firm* — Schwegman Lundberg & Woessner, P.A.

(57) ABSTRACT

Systems and methods are presented for evaluating and incorporating a plurality of input streams into a single input stream. In some embodiments, the system generates a first set of recommendations provided by a plurality of input streams and receives one or more selections of recommendations from the first set of input streams. The system determines a session intent based on the one or more selections and selects a set of input streams, from the plurality of input streams, corresponding to the one or more selection and the session intent. The system generates a second set of recommendations using the set of input streams and the session intent and causes presentation of the second set of recommendations on a user interface of a user device.

20 Claims, 7 Drawing Sheets

METHODS AND SYSTEMS FOR MANAGING N-STREAMS OF RECOMMENDATIONS

TECHNICAL FIELD

The subject matter disclosed herein generally relates to the processing of data. Specifically, the present disclosure addresses systems and methods for managing and evaluating disparate data streams for inclusion in a single data stream.

BACKGROUND

Web users rely on search algorithms to produce valid and targeted results or recommendations based on search terms entered into a browser or otherwise entered into a system. Current search algorithms generally only focus and refocus results based on search terms provided by a user in order to hone results and recommendations by removing certain of those recommendations. This approach finely tunes search results to attempt to correctly identify a goal result or recommendation for which the user is searching

BRIEF DESCRIPTION OF THE DRAWINGS

Some embodiments are illustrated by way of example and not limitation in the figures of the accompanying drawings.

DETAILED DESCRIPTION

Example methods and systems are directed to managing, evaluating, and organizing disparate input streams into a single input stream. The methods and systems are able to manage, evaluate, and weigh the relative merits of differing solutions for providing input streams and content of the input streams. For example, in some embodiments, the methods and systems presented can produce content feeds based on one or more algorithms, presented in a single feed, offering a platform for standard A/B tests for between-subjects experimental designs or within-subjects experimental designs. In some embodiments, the A/B tests may be composed of three or more input streams, to enable evaluative testing of greater than two input streams filtered into a single input stream.

By way of further example, in some embodiments, example methods and systems are directed to managing and evaluating recommendation algorithms performing different functions to provide recommendations into input streams, selecting recommendation algorithms for providing recommendation input streams for inclusion into the single input stream, organizing recommendation input streams receiving the recommendations from the recommendation algorithms, and presenting recommendations for display, from the selected recommendation algorithms. Individual recommendation input streams or recommendation algorithms may be used as individual building blocks that can be used to present content, in the form of recommendations, to an end user.

Evaluation, selection, and organization of the recommendation algorithms and their associated recommendations may enable fine grained control over an integrated input stream to facilitate an understanding of the relative merits of each recommendation input stream and the associated recommendation algorithm. This understanding may relate to content filtering approaches, collaborative filtering approaches, and other analytical approaches to providing recommendations for the integrated input stream; a context for deployment of the recommendation algorithms; and an evaluation of an approach of each recommendation algorithm. The recommendations from the various input streams can be presented, for example, to a user in a single graphical user interface. Further, the fine grained control over the integrated input stream can generate more accurate recommendations to a user based on that user's input.

In some example embodiments, methods and systems may determine a session intent or a user intent and select the recommendation streams for inclusion into the single input stream based on the determined session intent or user intent. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
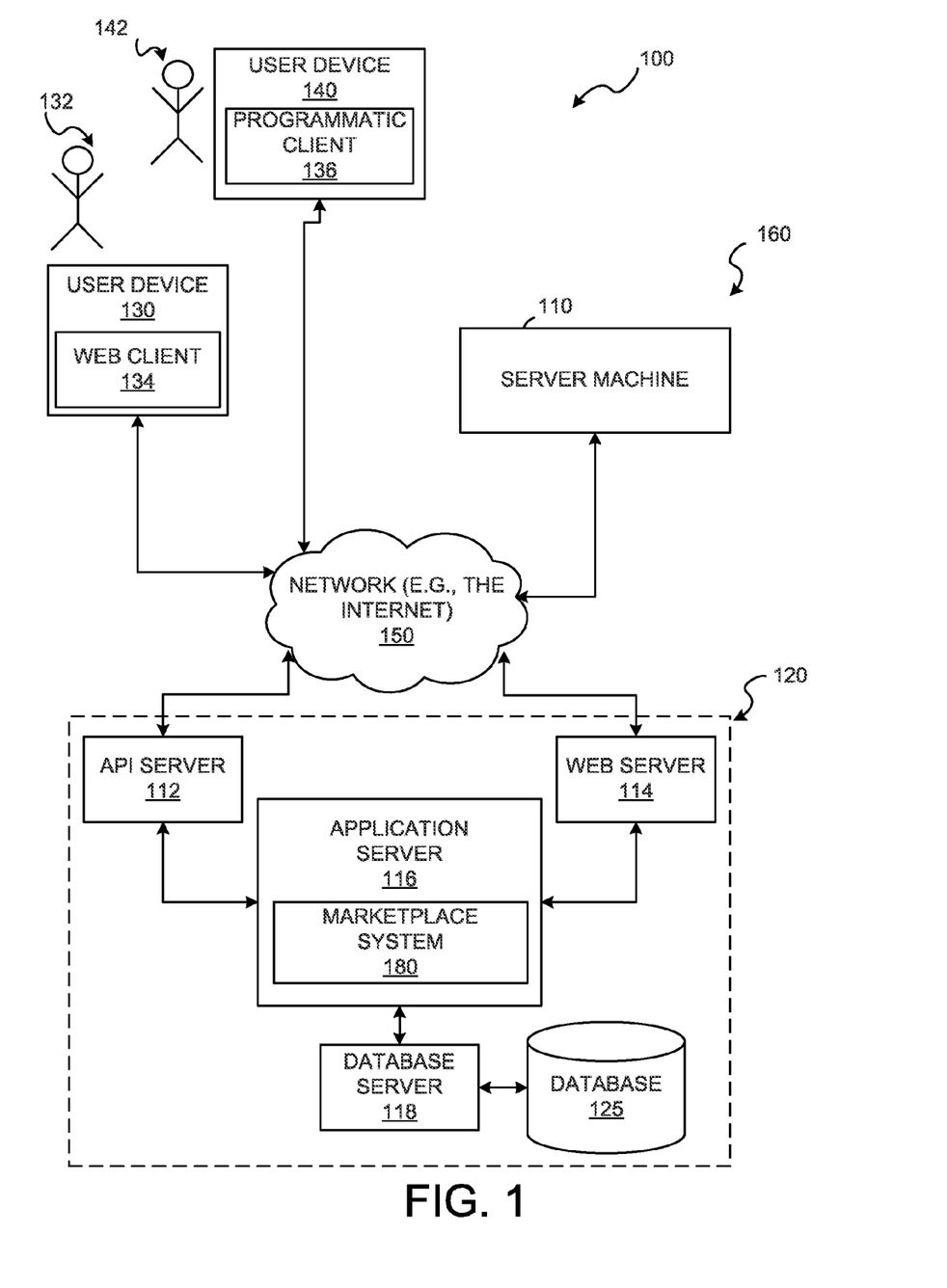
FIG. 1 is a network diagram illustrating a network environment suitable for matching buyers and sellers using calibrated user profiles and notification models, according to some example embodiments.

FIG. 1 is a network diagram illustrating a network environment 100 suitable for managing, evaluating, and organizing disparate input streams into a single input stream, according to some example embodiments. The network environment 100 includes a server machine 110, a publication system 120, and user devices 130 and 140, all communicatively coupled to each other via a network 150.

The server machine 110, explained in more detail with reference to FIG. 2, can form all or part of a network-based system 160 configured to select a set of input streams, generate a set of recommendations using the set of input streams, integrate the set of input streams into a single input stream, and present the set of recommendations for display. In some embodiments, the server machine 110 may be configured to receive one or more selections of recommendations and determine a session intent or a user intent, based on the selections, in order to select the set of input streams from a plurality of input streams. Although shown as separate from the publication system 120, in some embodiments, the server machine 110 can be included in the publication system 120 as a portion thereof. For example, the server machine 110 can form one or more hardware components in communication with other components of the publication system 120. In some embodiments, the server machine 110 could form one or more components of the publication system 120, implemented as a combination of hardware and software. For example, software forming a portion of the publication system 120 can include processor executable instructions which configure a processor of the publication system to perform operations of the server machine 110 described herein.

The publication system 120 is shown as including an API server 112, a web server 114, an application server 116, a database server 118, and database 125. In some embodiments, the publication system 120 forms all or part of a network-based system 160 (e.g., a cloud-based server system configured to provide one or more services to the user devices 130 and 140). The server machine 110, the publication system 120, and the user devices 130 and 140 may each be implemented in a computer system, in whole or in part, as described below with respect to FIG. 6. In some embodiments, the publication system can publish item listings or items for sale, as well as publications of information which can be viewed, searched, and recommended.

The API server 112 provides a programmatic interface by which the user devices 130 and 140 can access the publication system 120. The API server 112 can be in communication with the application server 116. The application server 116 may be implemented as a single application server 116 or a plurality of application servers. The application server 116, as shown, hosts one or more marketplace system 180, which comprises one or more modules or applications and which may be embodied as hardware, software, firmware, or any combination thereof. The application server 116 is, in turn, shown to be coupled to the database server 118 that facilitates access to one or more information storage repositories or databases, such as, the database 125.

The marketplace system 180 provides a number of marketplace functions and services to users that interface with the network-based system 160. For example, the marketplace system 180 can provide information for products for sale or at auction facilitated by the marketplace system 180 and displayable on the user devices 130 and 140. In some embodiments, the marketplace system 180 provides listings for products indicative of the information for products. The listings for products can be stored in the database 125 and may be searchable through the network-based system 160. The listings may include information indicative of a product, a condition of the product, terms of sale for the product, shipping information, a description of the product, a quantity, metadata associated with the product, metadata associated with coding for the listing, and information indicative of product organization, such as titles, categories, category taxonomies, and product interrelations. The marketplace system 180 can also facilitate the purchase of products in the online marketplace that can later be delivered to buyers via shipping or any conventional method.

While the marketplace system 180 is shown in FIG. 1 to form a part of the network-based system 160, it will be appreciated that, in some embodiments, the marketplace system 180 may form part of a payment service that is separate and distinct from the network-based system 160. Alternatively, the marketplace system 180 may form part of a payment service that is a part of the networked-based system 160. Further, while the client-server-based network environment 100 shown in FIG. 1 employs a user-server architecture, the present disclosure is not limited to such architecture, and may equally well find application in a distributed architecture system (e.g., peer-to-peer), for example. The marketplace system 180 may also be implemented as standalone software programs, which do not necessarily have networking capabilities.

The database server 118 is coupled to the database 125 and provides access to the database 125 for the user devices 130 and 140 and components of the server machine 110. The database 125 can be a storage device that stores information related to products; documents; web sites; metadata relating to products, documents, or websites; and the like.

Also shown in FIG. 1 are users 132 and 142. One or both of the users 132 and 142 can be a human user (e.g., a human being), a machine user (e.g., a computer configured by a software program to interact with the user device 130), or any suitable combination thereof (e.g., a human assisted by a machine or a machine supervised by a human). The user 132 is not part of the network environment 100, but is associated with the user device 130 and is a user of the user device 130. For example, the user device 130 can be a desktop computer, a vehicle computer, a tablet computer, a navigational device, a portable media device, a smartphone, or a wearable device (e.g., a smart watch or smart glasses) belonging to the user 132. Likewise, the user 142 is not part of the network environment 100, but is associated with the user device 140. As an example, the user device 140 can be a desktop computer, a vehicle computer, a tablet computer, a navigational device, a portable media device, a smartphone, or a wearable device (e.g., a smart watch or smart glasses) belonging to the user 142.

The user device 130 contains a web client 134 which may access the marketplace system 180 and, in some cases, the server machine 110, via the web interface supported by the web server 114. Similarly, a programmatic client 136 is configured to access the various services and functions provided by the marketplace system 180 and, in some cases, the server machine 110, via the programmatic interface provided by the API server 112. The programmatic client 136 may, for example, perform batch-mode communications among the programmatic client 136 and the networked-based system 160 and the server machine 110.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 6. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 150 may be any network that enables communication between or among machines, databases, and devices (e.g., the server machine 110 and the user device 130). Accordingly, the network 150 can be a wired network, a wireless network (e.g., a mobile or cellular network), or any suitable combination thereof. The network 150 can include one or more portions that constitute a private network, a public network (e.g., the Internet), or any suitable combination thereof. Accordingly, the network 150 can include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 150 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
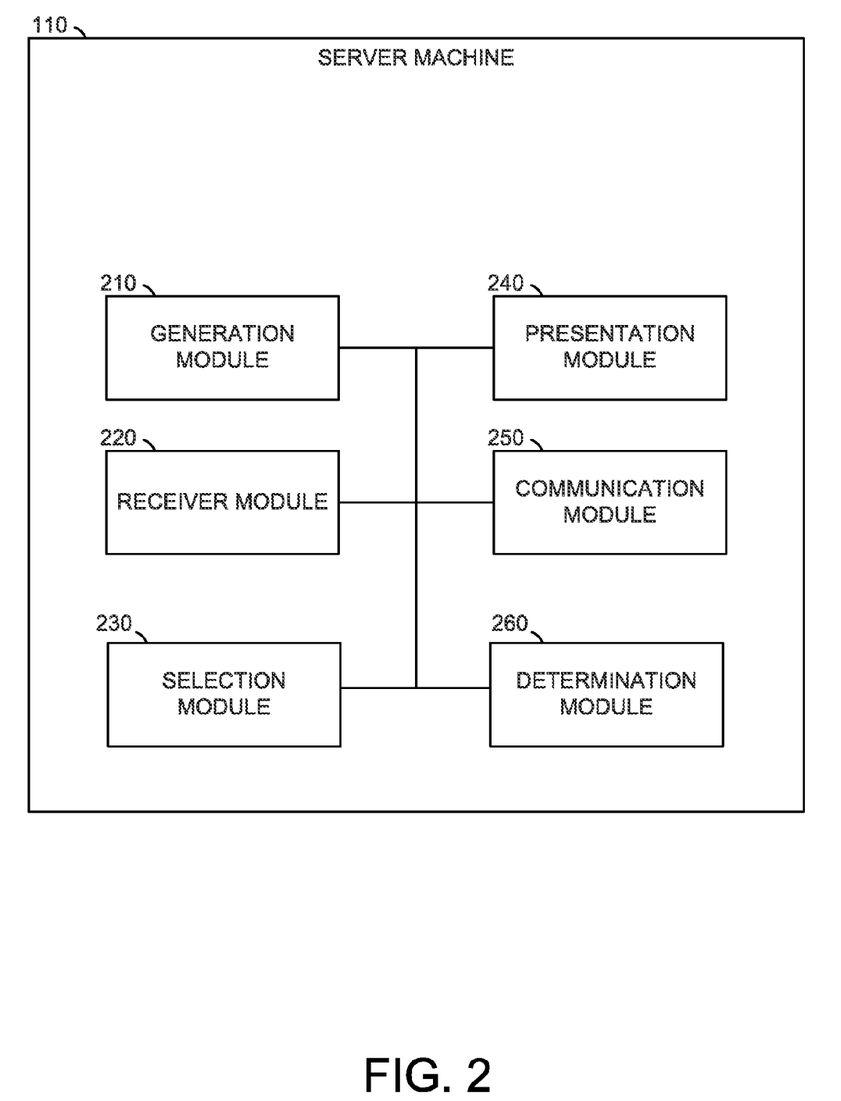
FIG. 2 is a block diagram illustrating components of a server machine suitable for generating calibrated user profiles and notification models, according to some example embodiments.

FIG. 2 is a block diagram illustrating components of the server machine 110, according to some example embodiments. The server machine 110 is shown as including a generation module 210, a receiver module 220, a selection module 230, a presentation module 240, a communication module 250, and a determination module 260 all configured to communicate with each other (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The generation module 210 can generate sets of recommendations based on input from the user 132 or 142 and a plurality of input streams. For example, the generation module 210 generates a first set of recommendations from a plurality of input streams and a second set of recommendations from a set of input streams comprising a subset of the plurality of input streams. For instance, the generation module 210 receives an instruction, signal, command, initiating event, interrupt, or other prompt to generate the first set of recommendations. The generation module 210 can communicate with the publication system 120 via the API server 112, the web server 114, or the communication module 250 to access the database server 118 and the database 125. The generation module 210 may apply the plurality of input streams to data stored on the database 125 to generate the first set of recommendations.

The generation module 210 can comprise a hardware module, described below in more detail. By way of example, in some embodiments, the generation module 210 can comprise a hardware processor configured to perform the operations relating to the generation of sets of recommendations. The operations for generating sets of recommendations are explained in more detail below.

The receiver module 220 receives one or more selections of recommendations from the sets of recommendations generated by the generation module 210. The selections received by the receiver module 220 can be received by the server machine 110, and thereby the receiver module 220, from the user device 130 or 140. In at least some embodiments, the selections include data representative of selections of the user 132 or 142. For example, the data representative of the selections can include data indicative of an interrupt caused by the user 132 or 142 interacting with a touch screen of the user device 130 or 140, a mouse, a keyboard, or other input device capable of enabling user interaction with a user interface of the user device 130 or 140. In some embodiments, the receiver module 220 can receive the one or more selections from the user device 130 or 140 via the communication module 250.

The selection module 230 selects a set of input streams from the plurality of input streams. The selection of the set of input streams can correspond to the one or more selection of recommendations received by the receiver module 220. In some embodiments, the selection module 230 can communicate with the receiver module 220 to receive data indicative of the one or more selections, and can communicate with the generation module 210 to transmit data indicative the selection of the set of input streams. In this manner, the generation of the second set of recommendations is based on the set of input streams selected by the selection module 230.

The presentation module 240 causes presentation of the sets of recommendations, generated by the generation module 210, on the user device 130 or 140 and within the graphical user interface of the user device 130 or 140. In some embodiments, the presentation module 240 formats the sets of recommendations, based on operations and methodologies discussed below. The presentation module 240 may be in communication with the communication module 250 to transmit data indicative of the format of the sets of recommendations to the user device 130 or 140 for presentation on the user device 130 or 140. In some embodiments, the presentation of the sets of recommendations on the user device 130 or 140 can be in the form of displaying the sets of recommendations on a screen of the user device 130 or 140, via a voice or simulated voice transmission of the results (e.g., a simulated voice of a digital personal assistant reading and/or describing the sets of recommendations), or any other suitable method of presentation. In some embodiments, where the presentation of the sets of results is displayed on a screen, the presentation module 240 can cause the user device 130 or 140 to present the sets of recommendations in a text based list format, in a graphically based format, or in a combination thereof. For example, in some embodiments, in the graphically based format, the presentation module 240 can present the user device 130 or 140 with a set of icons, where each icon is representative of one of the recommendations of the set of recommendations to be presented on the user device 130 or 140. The icons can be presented in a list view, in a grid view, or any other suitable arrangement of the icons, based on the operations and methodologies presented below.

The communication module 250 enables communication for the server machine 110. For example, in some embodiments, the communication module 250 enables communication between the generation module 210, the receiver module 220, the selection module 230, the presentation module 240, and the determination module 260. In some embodiments, the communication module 250 can enable communication between the server machine 110, the user device 130 or 140, and the publication system 120, as well as other systems capable of communicating with the server machine 110.

The determination module 260 determines a session intent based on the one or more selections of recommendations received by the selection module 230. In some embodiments, the determination module 260 can determine the session intent based on the one or more selections from the first set of recommendations generated by the generation module 210. In some embodiments, the determination module 260 can re-determine (e.g., modify or overwrite) the session intent based on one or more subsequent selections of recommendations received by the selection module 230. For example, in some embodiments, the determination module 260 can use abstract collaborative filtering models, or other models or processes used to determine a goal or intent of an interaction, to determine a session intent and scope of activity for the user 132 during the interaction session. Session intent can be determined, for example, based on search terms entered by the user 132 during the interaction session; results selected by the user 132 during the interaction session; similarities, associations, or comparisons between search terms entered by the user 132 and search terms entered by one or more other user; similarities, associations, or comparisons between results selected by the user 132 and results selected by one or more other user; and one or more session intent determined for other uses using similar or otherwise related search terms or interacting with similar or otherwise related results during an interaction session.

Figure 3:
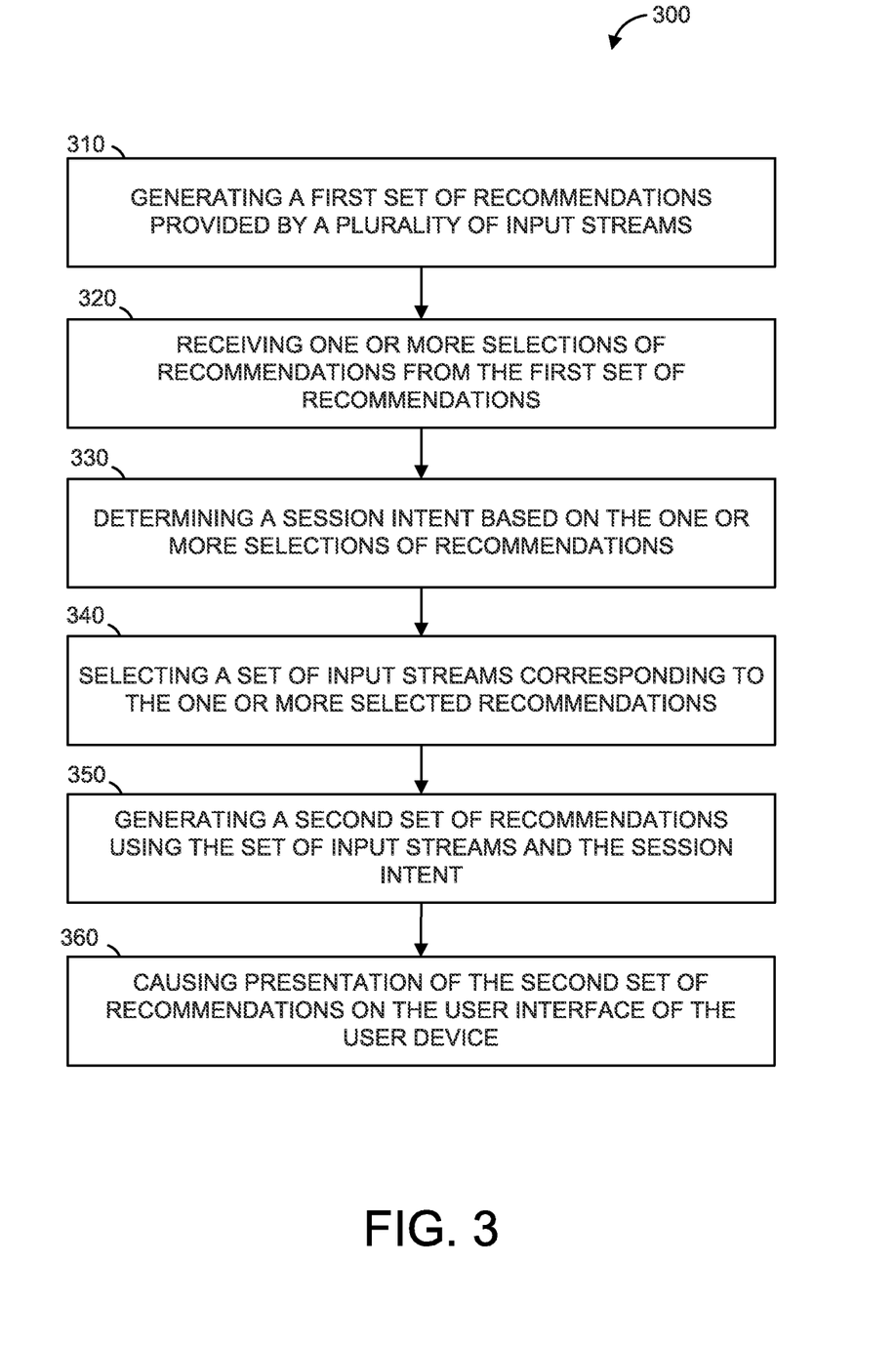
FIG. 3 is a flowchart illustrating operations of a system in performing a method of evaluating input streams and selecting streams for inclusion into a single stream, according to some example embodiments.
Figure 4:
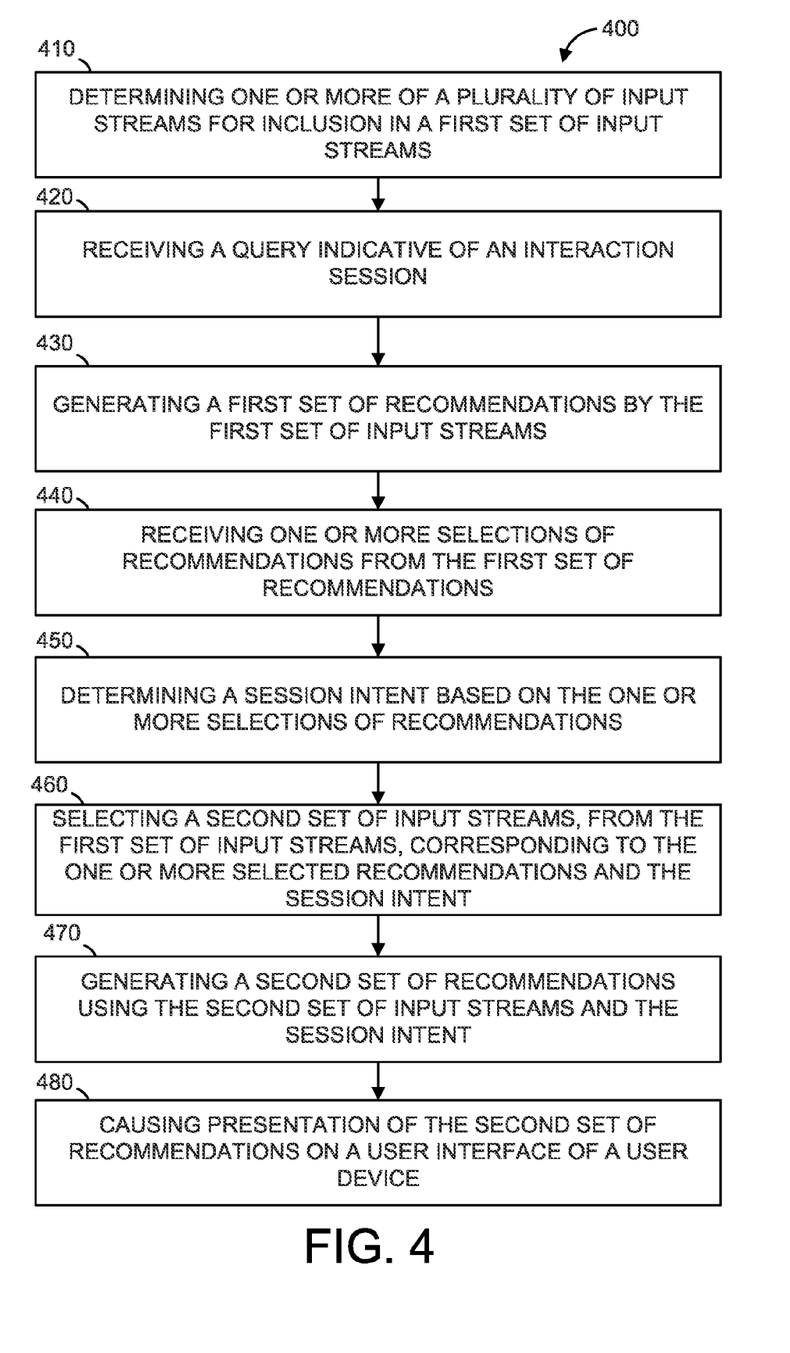
FIG. 4 is a flowchart illustrating operations of a device performing a method of evaluating input streams based on a query and a session intent, according to some example embodiments.
Figure 5:
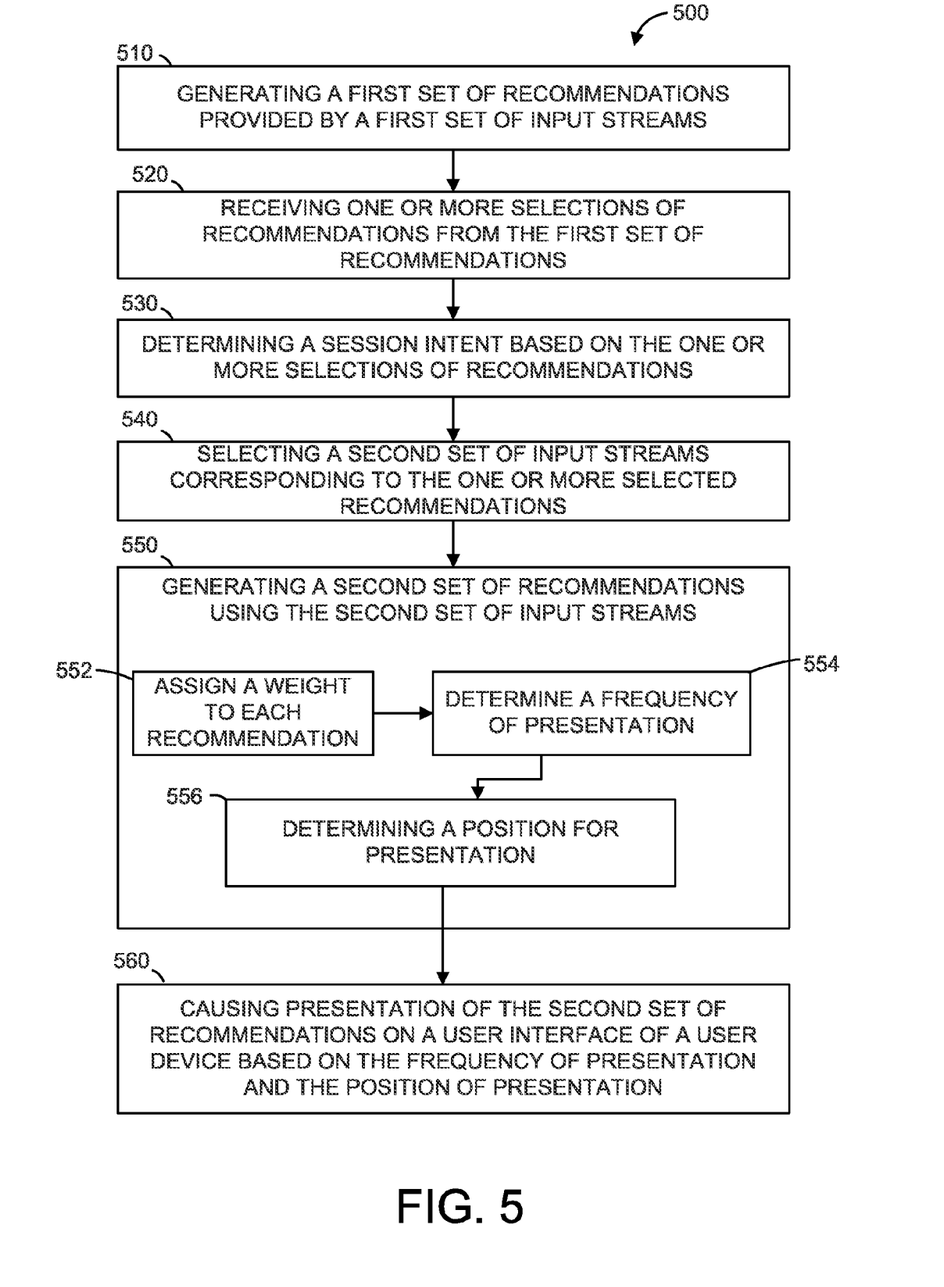
FIG. 5 is a flowchart illustrating operations of a device performing a method of evaluating input streams and selecting streams for inclusion into a single stream, according to some example embodiments.

FIGS. 3-5 are flowcharts illustrating operations of the server machine 110 in performing a method 300 of generating a set of recommendations from a set of selected input streams, according to some example embodiments. Operations in the method 300 may be performed by the server machine 110, using modules described above with respect to FIG. 2. As shown in FIG. 3, the method 300 includes operations 310, 320, 330, 340, 350, and 360.

In operation 310, the generation module 210 of the server machine 110 generates a first set of recommendations provided by a plurality of input streams. The input streams may be indicative of a plurality of content generation algorithms or content acquisition algorithms, such as recommendation algorithms. In some embodiments, the generation module 210 configures at least one processor associated with the server machine 110 to generate the first set of recommendations.

For example, where the database 125 contains data indicative of a plurality of items and item categories, the generation module 210 applies the plurality of input streams to the plurality of item and item categories to return the first set of recommendations, corresponding to a set of items and item categories from the plurality of items. In these embodiments, the first set of recommendations correspond to at least a portion of the instruction, signal, command, interrupt, or initiating event which prompted the generation of the first set of recommendations. For example, in some embodiments, the prompt may be a search, initiated by the user 132 on the user device 130, submitted to the server machine 110 with keywords. The search may be received by the receiver module 220 or the communication module 250, and generate an interrupt in the server machine 110 causing the server machine 110 to process and apply the search. Here, the first set of recommendations may be generated in response to the interrupt indicative of the search and correspond to the search by sharing a characteristic with the one or more of the keywords, having a category designation matching or relating to one or more of the keywords, or the like.

In some embodiments, each of the plurality of input streams is indicative of a selection algorithm from a set of selection algorithms. For example, the plurality of input streams may include selection algorithms of K Nearest Neighbor, Pearson Correlation, content filtering based approaches, collaborative filtering based approaches, or the like. In some embodiments, one or more of the plurality of input streams may be indicative of a single selection algorithm, where the selection algorithm is weighted, ranked, or otherwise manipulated to produce different recommendations for each of the one or more input streams associated with the selection algorithm. As noted above, in some embodiments, the selection algorithm of each of the plurality of input streams may be applied to the data of the database 125 of the publication system 120 to generate the first set of recommendations.

Content-based filtering approaches can take into consideration attributes of content being recommended (e.g., recommendations) to pair together items that may be of interest to an individual. For example, where the user 132 is communicating with the server machine 110 via the user device 130 to generate recommendations related to clothing, a color of clothing or patterns on a blouse may be paired for the user 132 who tends to purchase items with an identifiable similarity. This approach can use metadata, indicative of characteristics of an item or category, to group recommendation categories such as music (e.g., beats per minute, vocal style), art (e.g., age of piece, style, biographical information of the author), food (e.g., flavor similarity, complementary flavors, allergies), stocks (e.g., volume in the last day of trading, 52 week high and low, range of price fluctuation over variable periods of time), or any other categories of recommendation. These example items and categories may have a plurality of characteristics which may be combined or isolated by an input stream in order to provide recommendations. In some embodiments, the characteristics of the item or category may be isolated by an input stream to highlight a specific characteristic based on interaction from the user 132 or a session intent, as will be explained in more detail below. Although discussed in relation to content-based filtering approaches, it will be understood that any of the input streams may generate recommendations based on characteristics of items, users, and the like.

In some embodiments, after generating the first set of recommendations, the presentation module 240 of the server machine 110 may present the first set of recommendations for display. The determination module 260 of the server machine 110 may organize the first set of recommendations based on a characteristic of the input stream providing each of the set of recommendations and a context of each of the recommendations. For example, characteristics of the input stream may include an expansive nature of the input stream, a narrowing nature of the input stream, correlation between the recommendations of the input stream and the input of the user 132, classification, characteristics of the recommendations being produced by a particular input stream, and the like. The server machine 110 may then, based on the organization, present the first set of recommendations for display.

Further, in some embodiments, the determination module 260 of the server machine 110 may assign a weight to each of the recommendations of the first set of recommendations based on the input stream providing the recommendation. In these embodiments, the presentation module 240 of the server machine 110 may present the first set of recommendations for display based on the weight assigned to each of the recommendations.

In operation 320, the server machine 110 receives one or more selections of recommendations from the first set of recommendations. In some embodiments, the receiver module 220 of the server machine 110 receives the one or more selections of recommendations. For example, the receiver module 220 may operate in conjunction with the generation module 210 to identify recommendations from the first set of recommendations indicative of the one or more selections of recommendations. In some embodiments, the receiver module 220 can include processor executable instructions to enable a user to select one or more of the first set of recommendations, such as in a graphical user interface or a portion of a graphical user interface provided by the server machine 110. For example, in some embodiments, the receiver module 220 configures at least one processor associated with the server machine 110 to receive the one or more selections.

In some embodiments, the user 132 may make the one or more selections of recommendations by interacting with an interactive data object indicative of the recommendation. For example, the user 132 may select the interactive object using a keyboard, mouse, touchscreen, or other input device, thereby causing an interrupt or a signal indicative of an interrupt within the server machine 110. The server machine 110 can receive the interrupt and interpret the interrupt based on the one or more selections made by the user 132 on the interactive data objects associated with the recommendations.

In operation 330, the determination module 260 of the server machine 110 determines a session intent based on the one or more selections of recommendations from the first set of recommendations. The session intent, in some embodiments, may be indicative of a user intent. For example, the session intent may represent that, for a first interaction session, the user 132 has a browsing intent. In a second interaction session with the server machine 110, the user 132 may have a shopping intent, performing research on a category of items or a specific item in order to determine which item to buy or from what vendor to purchase the item. In some embodiments, the interrupts generated by the user 132 making the one or more selections may cause the server machine 110 to initiate the determination of the session intent by initiating the determination module 260.

An interaction session can be a period during which the user 132 performs actions interacting with the server machine 110 or the user device 130 which, in turn, interacts with the server machine 110. The interaction session may be determined by the user 132 logging in to a service, system, or website; a logging in and logging out action, indicating the initiation and termination of an interactive session; opening a system window or web browser; a period of time during which the user 132 interacts with a system using a set of search terms provided by the user 132; a period of time during which the user 132 interacts with a system using search terms relating to a set of search terms initially provided by the user 132; or any other suitable method of determining an interaction session.

In some embodiments, the determination module 260 of the server machine 110 may determine the session intent based on the one or more selections of recommendations from the first set of recommendations. For example, in some embodiments, the determination module 260 configures at least one processor associated with the server machine 110 to determine the session intent. The determination module 260 can communicate with the receiver module 220, such that the determination module 260 may access or otherwise receive the one or more selections of recommendations. The determination module 260 may then apply one or more algorithms on the one or more selections of recommendations to determine the session intent. For example, the determination module 260 may evaluate the one or more selections to determine whether the one or more selections indicate a narrowing focus of the first set of recommendations, social browsing of the first set of recommendations, or expansive browsing of the first set of recommendations. In some embodiments, the determination module 260 may use abstract collaborative filtering models to detect the session intent or user intent and the scope of activity indicative of the one or more selections of recommendations.

In operation 340, the server machine 110 selects a set of input streams, from the plurality of input streams, corresponding to the one or more selected recommendations and the session intent. The selection module 230 of the server machine 110 can select the set of input streams from the plurality of input streams. For example, in some embodiments, the selection module 230 configures at least one processor associated with the server machine 110 to select the set of input streams. In some embodiments, the selection module 230 can communicate with the receiver module 220 or the determination module 260 to select the set of input streams corresponding to the one or more selected recommendations and the session intent or the user intent. For example, where the session intent is determined, by the determination module 260, to be focused and drilling into a specific category or set of items, as indicated by the one or more selected recommendations, the determination module 260 may select certain of the plurality of input streams that tends to narrow a search by providing recommendations with increasing specificity in relation to the search.

In operation 350, the server machine 110 generates a second set of recommendations using the set of input streams and the session intent. In some embodiments, the generation module 210 of the server machine 110 can generate the second set of recommendations based on the session intent using the set of input streams. For example, in some embodiments, the generation module 210 configures at least one processor associated with the server machine 110 to generate the second set of recommendations.

For example, similar to the generation of the first set of recommendations, the generation module 210 can generate the second set of recommendations using a prompt, such as keywords of a search, and the session intent as input to apply the set of input streams to the data on the database 125 of the publication system 120, in some embodiments. Further, the generation module 210 may perform subsequent iterations, generating subsequent sets of recommendations, based on the server machine 110 receiving additional prompts, determining a broadened, narrowed, or different session intent, or the like. In this manner, the generation module 210 may continually provide sets of recommendations responsive to the interaction of the user 132 or another system with the server machine 110.

In operation 360, the server machine 110 causes presentation of the second set of recommendations on the user interface of the user device 130. In some embodiments, prior to the receiver module 220 receiving the one or more selections, the presentation module 240 can cause presentation of the first set of recommendations on the user interface of the user device 130. The presentation module 240 of the server machine 110 can also cause presentation of the second set of recommendations on the user interface of the user device 130. For example, in some embodiments, the presentation module 240 configures at least one processor associated with the server machine 110 to present the second set of recommendations. Additionally, the presentation module 240 may present subsequent sets of recommendations for display. In some embodiments, the presentation module 240 can communicate with the generation module 210 to receive the first set of recommendations, the second set of recommendations, or subsequent sets of recommendations for presentation. In some embodiments, the presentation module 240 may interact with the communication module 250 to transmit the first set of recommendations, the second set of recommendations, or subsequent sets of recommendations for display on the user device 130 or 140.

In some embodiments, the server machine 110 can organize the second set of recommendations prior to presenting the second set of recommendations for display. The server machine 110 may organize the second set of recommendations based on the characteristic of the input stream providing each of the recommendations. In some embodiments, the server machine 110 may further organize the second set of recommendations based on the context of each of the recommendations and a status of the input stream as one of the set of input streams. In some embodiments the presentation module 240 of the server machine 110 may organize the first set of recommendations, the second set of recommendations, or subsequent sets of recommendations for display.

FIG. 4 is a flowchart illustrating operations of the server machine 110 in performing a method 400 of generating a set of recommendations from a set of selected input streams, according to some example embodiments. Operations in the method 400 may be performed by the server machine 110, using modules described above with respect to FIG. 2. As shown in FIG. 4, the method 400 includes operations 410, 420, 430, 440, 450, 460, 470, and 480.

In operation 410, the selection module 230 of the server machine 110 determines one or more of a plurality of input streams for inclusion in a first set of input streams corresponding to a predetermined selection of at least one of a characteristic of the input stream, a type of a query, or a user interaction. In some embodiments, a user, such as user 132, may provide instructions enabling the server machine 110 to determine one or more of the plurality of input streams for inclusion in the first set of input streams.

For example, in some embodiments, a user may seek to evaluate recommendation algorithms in the plurality of input streams. The user may perform A/B tests of between-subject experimental designs or within-subject experimental designs of recommendation algorithms, of user interfaces, or the like for providing recommendations for the user 132. The A/B tests may be between three or more input streams. The user can thereby experiment with quasi-experimental trials, randomized controlled trials, and multivariate experimental designs for input stream or recommendation algorithm evaluation and comparison. Method 400 can enable the user to simplify presentation of multiple algorithms (facilitating experimentation with 1 . . . n recommendation algorithms) and the evaluation of those algorithms. The evaluation of the recommendation algorithms, from the user's view may be an evaluation for any desired downstream effect, such as views, purchases, sharing of items or data, favorites, comments, adding items or data to a list (e.g., a photo sharing social media service), and the like.

By way of further example, the user can select the first set of input streams, represented by three input streams. The selection of the first set of input streams can generate an interrupt. The selection module 230 of the server machine 110 selects the first set of input streams from the plurality of input streams in response to the interrupt. In some embodiments, the user can select characteristics of input streams or recommendations generated by the input streams, generating an interrupt passed to the server machine 110. Here, the selection module 230 of the server machine 110 may determine which of the plurality of input streams to include in the first set of input streams based on direct selection of the user, based on a determination of corresponding characteristics of certain of the plurality of input streams, or based on other suitable determination or selection methods.

Given equal values for frequency and position, 33% of the recommendations provided to the user 132, for example, may be from each of the first set of input streams. The user or the server machine 110 may then evaluate the set of input streams based on which of the first set of input streams has the most desirable downstream effects (e.g. views, purchases, favorites). For example, a first input stream of the first set of input streams, providing the user 132 with a proportionately greater set of recommendations with which the user 132 interacts, may be determined to have more desirable downstream effects than the other two input streams of the first set of input streams. Although the present disclosure is discussed as having three input streams, it will be understood by one skilled in the art that the first set of input streams may include any number of input streams (i.e., 1, 2, 3, . . . n) without departing from the present disclosure.

In operation 420, the server machine 110 receives a query indicative of an interaction session. In some embodiments, the receiver module 220 of the server machine 110 may receive the query. As discussed above, in relation to a prompt, the server machine 110 may receive a query from the user 132, such as a set of keywords. The query can prompt the server machine 110 to generate the first set of recommendations, the second set of recommendations, or a subsequent set of recommendations in response to the query.

In operation 430, the generation module 210 of the server machine 110 generates a first set of recommendations by the first set of input streams of the plurality of input streams. The input streams may be indicative of a plurality of content algorithms, such as recommendation algorithms. In some embodiments, the operation 430 may be executed similarly to the operation 310 described above. In some embodiments, the first set of recommendations are generated in response to the query of operation 410, as noted above in reference to the operation 420.

In operation 440, the receiver module 220 of the server machine 110 receives one or more selections of recommendations from the first set of recommendations. In some embodiments, the operation 440 may be executed similarly to the operation 320 described above.

In operation 450, the determination module 260 of the server machine 110 determines a session intent based on the one or more selections of recommendations from the first set of recommendations. In some embodiments, the operation 450 may be executed similarly to the operation 330 described above in relation to FIG. 3. In some embodiments, the session intent is further based on the query of operation 420. For example, the receiver module 220 of the server machine 110 may receive a query including vague search terms and one or more selections indicating a broad cross section of the first set of input streams. The determination module 260 of the server machine 110 may then determine that the session intent of the interaction session initiated by the query is a browsing intent. In such examples, a casual browsing intent may indicate that the user 132 is interested generally in a topic or in a casual interaction session similar to window shopping.

By way of further example, the receiver module 220 of the server machine 110 may receive a query including specific terms indicative of an object, a good, a category of goods, or the like, such as terms including a serial number of a product, a model number, or generalized terms which cooperate to form a narrow query. The receiver module 220 of the server machine 110 may then receive one or more selection of recommendations which reflect a narrow interpretation of the query. Here, the determination module 260 of the server machine 110 can determine the session intent of the interaction session to be a product-specific or category-specific session. This session intent may be indicative of a drilling down or narrowing of the query to locate a specific item or set of items of interest.

In operation 460, the selection module 230 of the server machine 110 selects a second set of input streams, from the first set of input streams, corresponding to the one or more selected recommendations and the session intent. In some embodiments, the operation 460 may be executed similarly to the operation 340 described above. In some embodiments, the second set of input streams may be a smaller subset included in the first set of input streams. For example, where the determination module 260 of the server machine 110 has determined the session intent to be one of casual browsing or window shopping, the selection module 230 of the server machine 110 can select input streams that tend to broaden a field of search or generate recommendations included in other related categories, which may or may not correspond to the search terms of the query. Where the determination module 260 of the server machine 110 has determined the session intent is narrow (e.g., item specific or category specific), the selection module 230 of the server machine 110 may select input streams that tend to narrow a field of search based on user or system data entered into the input stream.

In operation 470, the generation module 210 of the server machine 110 generates a second set of recommendations using the second set of input streams and the session intent. In some embodiments, the operation 470 can be executed similarly to the operation 350 described above.

In operation 480, the presentation module 240 of the server machine 110 causes presentation of the second set of recommendations on the user interface of the user device 130. In some embodiments, prior to the receiver module 220 receiving the one or more selections in operation 440, the presentation module 240 can cause presentation of the first set of recommendations on the user interface of the user device 130. In some embodiments, the operation 480 can be executed similarly to the operation 360 described above.

FIG. 5 is a flowchart illustrating operation of the server machine 110 in performing a method 500 of generating a set of recommendations from a set of selected input streams. Operations in the method 500 may be performed by the server machine 110, using modules described above with respect to FIG. 2. As shown in FIG. 5, the method 500 includes operations 510, 520, 530, 540, 550, 552, 554, 556, and 560.

In operation 510, the generation module 210 of the server machine 110 generates a first set of recommendations provided by a first set of input streams of a plurality of input streams. The input streams may be indicative of a plurality of content algorithms, such as recommendation algorithms. In some embodiments, the operation 510 can be executed similarly to the operation 310.

In some embodiments, each of the plurality of input streams is indicative of a selection algorithm from a set of selection algorithms. For example, the plurality of input streams may include selection algorithms of K Nearest Neighbor, Pearson Correlation, content filtering based approaches, or the like. In some embodiments, one or more of the plurality of input streams may be indicative of a single selection algorithm, where the selection algorithm is weighted, ranked, or otherwise manipulated to produce differing recommendations for each of the one or more input streams associated with the selection algorithm.

In operation 520, the receiver module 220 of the server machine 110 receives one or more selections of recommendations from the first set of recommendations. In some embodiments, the operation 520 can be executed similarly to the operation 320 described above.

In operation 530, the determination module 260 of the server machine 110 determines a session intent based on the one or more selections of recommendations from the first set of recommendations. The session intent, in some embodiments, may be indicative of a user intent. For example, the session intent may represent that for a first interaction session, the user 132 has a browsing intent. In a second interaction session with the server machine 110, the user 132 may have a shopping intent, performing research on a category of items or a specific item in order to determine which item to buy or from what vendor to purchase the item. In some embodiments, the operation 530 may be executed similarly to the operation 330.

In operation 540, the selection module 230 of the server machine 110 selects a second set of input streams, from the plurality of input streams, corresponding to the one or more selected recommendations and the session intent. The selection module 230 of the server machine 110 may also indicate a third set of input streams from within the first set of input streams, but not selected for inclusion in the second set of input streams. In at least some embodiments, the input streams of the second set of input streams have a greater weight than the input streams in the third set of input streams. The lower weight of the third set of input streams may enable recommendations from the third set of input streams to be included in the second set of recommendations, but with less frequency and less prominently than the recommendations indicative of the second set of input streams.

In operation 550, the generation module 210 of the server machine 110 generates a second set of recommendations using the second set of input streams and the session intent. The second set of recommendations, therefore, may comprise recommendations generated from the second set of input streams. In some embodiments, the generation module 210 of the server machine 110 may generate the second set of recommendations using the second set of input streams, the third set of input streams, and the session intent. In these embodiments, the second set of recommendations may include at least one recommendation from the third set of input streams, while being primarily composed of recommendations from the second set of recommendations.

In generating the second set of recommendations, in operation 552, the determination module 260 of the server machine 110 assigns a weight to each of the recommendations of the second set of recommendations based on the input stream providing the recommendation. The weight assigned to each recommendation can be based on the type of input stream, the underlying algorithm of the input stream, an evaluation of a relation value between the input stream and the one or more selections of the user 132, information about the user 132 to which the server machine 110 has access, or other suitable factors.

In operation 554, the determination module 260 of the server machine 110 determines a frequency of presentation for recommendations of the second set of recommendations based on the weight for each recommendation. For example, recommendations generated by a first input stream with a first weight may be presented with higher frequency than recommendations generated by a second input stream and a third input stream, where the first weight is greater than the weights of the second and third input streams. In some embodiments, the frequency of presentation may not be directly related to the weight for each recommendation. In these embodiments, the determination module 260 of the server machine 110 may determine frequency of presentation based on a plurality of factors in which the weight of the recommendation is included. The determination module 260 of the server machine 110 can include other factors such as one or more characteristic of the recommendation, the number of recommendations provided by the input stream, a comparison of characteristics between two or more recommendations, an evaluation of a relation value between the recommendation and the one or more selection of the user 132, or other suitable factors.

In operation 556, the presentation module 240 of the server machine 110 determines a position of presentation for recommendations of the second set of recommendations based on the weight of each recommendation and the frequency of presentation. For example, recommendations with a higher weight may be positioned prominently in a graphical user interface presented to the user 132. In some embodiments, the recommendations may be arranged to create or prevent clusters of recommendations with a similar weight in an area of the graphical user interface presented to the user 132. Further, in some embodiments, the recommendations may be arranged to create or prevent clusters of recommendations from the same input stream in an area of the graphical user interface presented to the user 132.

In operation 560, the presentation module 240 of the server machine 110 causes presentation of the second set of recommendations on the user interface of the user device 130 (e.g., by causing the user device 130 to display the second set of recommendations) based on the frequency of presentation and the position of presentation for each recommendation of the second set of recommendations. In some embodiments, the presentation module 240 can cause the presentation of the first set of recommendations on the user interface of the user device 130 prior to the receiver module 220 receiving the one or more selections in operation 520. In some embodiments, the determination module 260 of the server machine 110 may organize the second set of recommendations prior to presenting the second set of recommendations for display, by the presentation module 240. The determination module 260 of the server machine 110 may organize the second set of recommendations based on the characteristic of the input stream providing each of the recommendations. In some embodiments, the determination module 260 of the server machine 110 may further organize the second set of recommendations based on the context of each of the recommendations and a status of the input stream as one of the set of input streams. In some embodiments, the presentation module 240 and the determination module 260 of the server machine 110 can cooperate to determine the position of presentation of the second set of recommendations, or graphical representations (e.g., icons) of the second set of recommendations.

The one or more of the methodologies described herein may obviate a need for certain efforts or resources that otherwise would be involved in generating an input stream from a plurality of input streams for generating recommendations to a user and thereby reducing a number of search iterations that the user may need to perform, saving processing cycles of the server machine 110, the user device 130, and the publication system 120. For example, the methods and systems presented herein may perform operations of weighing relative merits of differing solutions for content recommendation to a user. As described herein, recommendation algorithms, providing a basis for the plurality of input streams may serve as building blocks to be used to present content to the user. The systems and methods may take into account a type of algorithm (e.g., content filtering approaches, collaborative filtering approaches, etc.), a context of deployment (e.g., a category being displayed so the method or system can determine if a recommendation algorithm is appropriate for the category), and an evaluation of each recommendation algorithm. Efforts expended by a user in aggregating input streams, narrowing searched fields, and broadening searched fields for additional areas of interest may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 6:
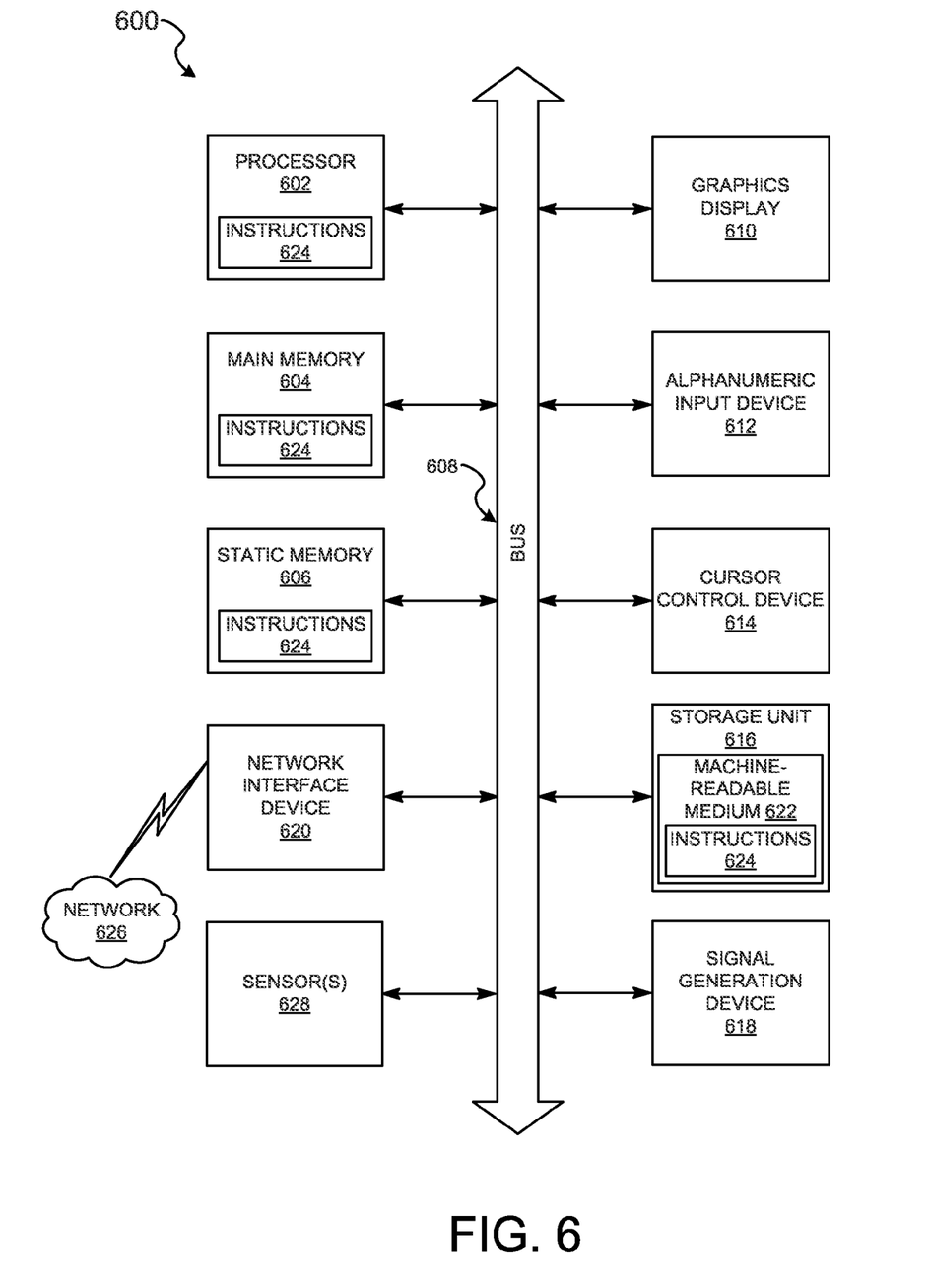
FIG. 6 is a block diagram illustrating components of a machine, according to some example embodiments, able to read instructions from a machine-readable medium and perform any one or more of the methodologies discussed herein.

FIG. 6 is a block diagram illustrating components of a machine 600, according to some example embodiments, able to read instructions 624 from a machine-readable medium 622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 6 shows the machine 600 in the example form of a computer system (e.g., a computer) within which the instructions 624 (e.g., software, a program, an application, an applet, an app, or other executable code) for causing the machine 600 to perform any one or more of the methodologies discussed herein may be executed, in whole or in part.

In alternative embodiments, the machine 600 operates as a standalone device or may be communicatively coupled (e.g., networked) to other machines. In a networked deployment, the machine 600 may operate in the capacity of a server machine or a client machine in a server-client network environment, or as a peer machine in a distributed (e.g., peer-to-peer) network environment. The machine 600 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include any collection of machines that individually or jointly execute the instructions 624 to perform all or part of any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, a cathode ray tube (CRT), or any other display capable of displaying graphics or video). The machine 600 may also include an alphanumeric input device 612 (e.g., a keyboard or keypad), a cursor control device 614 (e.g., a mouse, a touchpad, a trackball, a joystick, a motion sensor, an eye tracking device, or other pointing instrument), a storage unit 616, a signal generation device 618 (e.g., a sound card, an amplifier, a speaker, a headphone jack, or any suitable combination thereof), and a network interface device 620.

The storage unit 616 includes the machine-readable medium 622 (e.g., a tangible and non-transitory machine-readable storage medium) on which are stored the instructions 624 embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered machine-readable media (e.g., tangible and non-transitory machine-readable media). The instructions 624 may be transmitted or received over the network 150 or 626 via the network interface device 620. For example, the network interface device 620 may communicate the instructions 624 using any one or more transfer protocols (e.g., hypertext transfer protocol (HTTP)).

In some example embodiments, the machine 600 may be a portable computing device, such as a smart phone or tablet computer, and have one or more additional input components (e.g., sensors or gauges). Examples of the additional input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions 624. The term "machine-readable medium" shall also be taken to include any medium, or combination of multiple media, that is capable of storing the instructions 624 for execution by the machine 600, such that the instructions 624, when executed by one or more processors of the machine 600 (e.g., processor 602), cause the machine 600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

Figure 7:
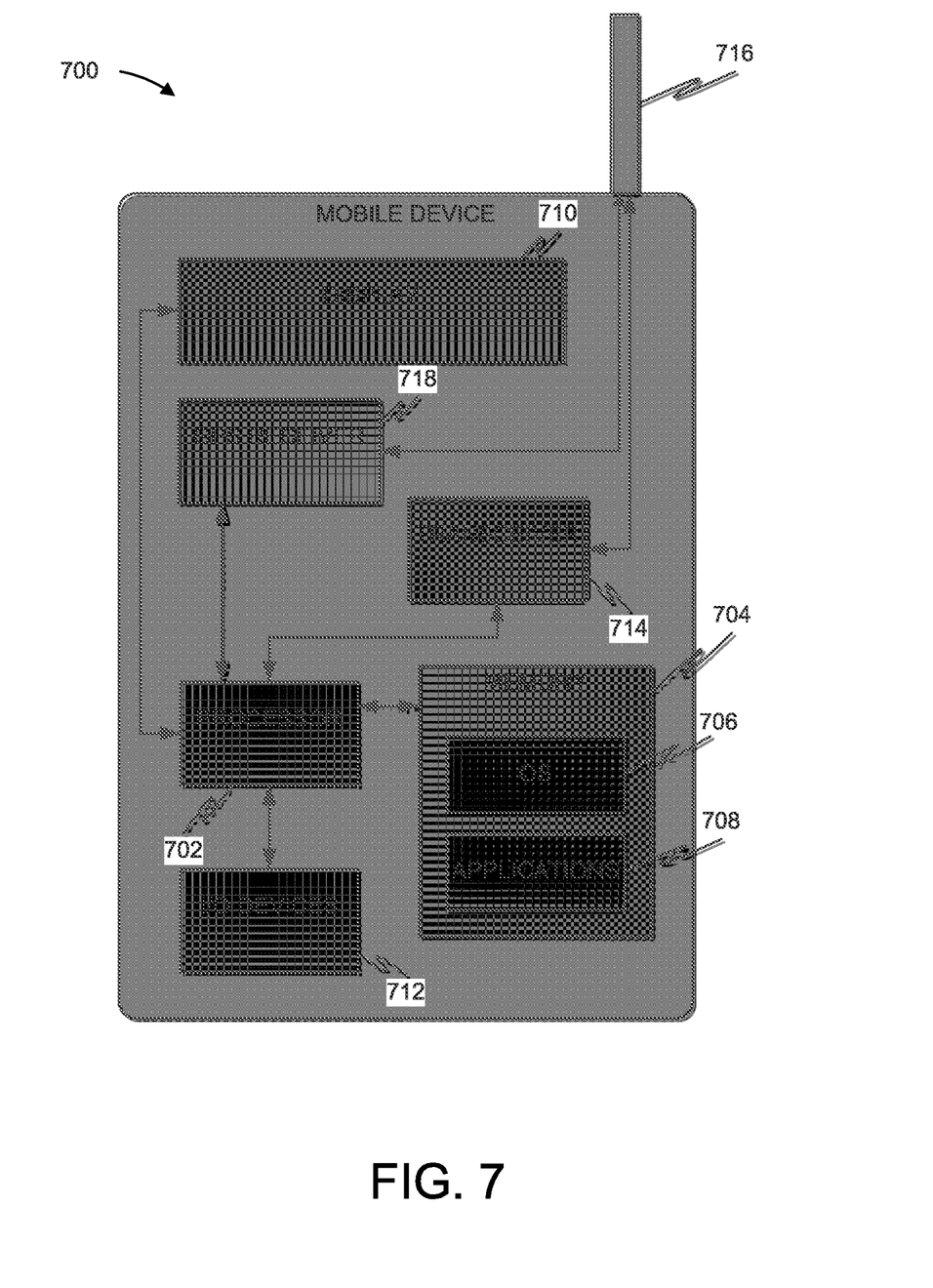
FIG. 7 is a block diagram illustrating components of a mobile device according to some example embodiments, able to read instructions from a machine-readable medium and perform any one or more of the methodologies discussed herein.

FIG. 7 is a block diagram illustrating a mobile device 700, according to some example embodiments. The mobile device 700 can be an implementation of the user device 130 and 140. In some embodiments, the mobile device 700, in communication with the server machine 110 can perform portions of one or more of the methodologies described herein, and can provide input from the user 132 or 142 to the server machine 110. The mobile device 700 can include a processor 702. The processor 702 can be any of a variety of different types of commercially available processors suitable for mobile devices 700 (for example, an XScale architecture microprocessor, a Microprocessor without Interlocked Pipeline Stages (MIPS) architecture processor, or another type of processor). A memory 704, such as a random access memory (RAM), a Flash memory, or other type of memory, is typically accessible to the processor 702. The memory 704 can be adapted to store an operating system (OS) 706, as well as application programs 708, such as a mobile location enabled application that can provide location based services to a user. The processor 702 can be coupled, either directly or via appropriate intermediary hardware, to a display 710 and to one or more input/output (I/O) devices 712, such as a keypad, a touch panel sensor, a microphone, and the like. Similarly, in some example embodiments, the processor 702 can be coupled to a transceiver 714 that interfaces with an antenna 716. The transceiver 714 can be configured to both transmit and receive cellular network signals, wireless data signals, or other types of signals via the antenna 716, depending on the nature of the mobile device 700. Further, in some configurations, a GPS receiver 718 can also make use of the antenna 716 to receive GPS signals.

The mobile device 700 can be configured to perform portions of any one or more of the methodologies discussed herein. For example, the memory 704 of the mobile device 700 may include instructions comprising portions of one or more of the generation module 210, the receiver module 220, the selection module 230, the presentation module 240, and the determination module 260. For example, one or more of the modules described above can be distributed between the server machine 110 and the mobile device 700. The modules can configure the processor 702 of the mobile device 700 to perform one or more of the operations outlined above with respect to each module. In some embodiments, the mobile device 700 and the machine 600 can each store at least a portion of the modules discussed above and cooperate to perform the methods described above, as will be explained in more detail below.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   generating a first set of recommendations using a plurality of input streams, each input stream of the plurality of input streams corresponding to a selection algorithm;
   causing presentation of the first set of recommendations on a user interface of a user device;
   receiving, via the user interface, one or more selections of recommendations from the first set of recommendations;
   determining, by a processor of a machine, a session intent based on the one or more selections of recommendations from the first set of recommendations;
   selecting a set of input streams, from the plurality of input streams, based on the one or more selections of recommendations and the session intent, the set of input streams being a subset of the plurality of input streams and corresponding to a subset of selection algorithms;
   generating a second set of recommendations using the selected set of input streams, the second set of recommendations excluding at least a portion of the first set of recommendations generated using input streams excluded from the set of input streams; and
   causing presentation of the second set of recommendations on the user interface of the user device.

2. The method of claim 1 further comprising:
   receiving a query indicative of an interaction session.

3. The method of claim 2, wherein the first set of recommendations is generated in response to the query.

4. The method of claim 2 wherein the set of input streams is a second set of input streams and the first set of recommendations is generated from a first set of input streams of the plurality of input streams with the second set of input streams being a subset of the first set of input streams, and the method further comprising:
   determining one or more of the plurality of input streams for inclusion in the first set of input streams corresponding to a predetermined selection of at least one of a characteristic of an input stream, a type of the query, or a user interaction.

5. The method of claim 1, wherein each input stream of the plurality of input streams is indicative of a selection algorithm of a set of selection algorithms.

6. The method of claim 1, wherein the session intent is indicative of a user intent.

7. The method of claim 1 further comprising:
   assigning a weight to each recommendation of the first set of recommendations based on an input stream of the plurality of input streams providing the recommendation; and
   causing presentation of the first set of recommendations based on the weight.

8. The method of claim 1 further comprising:
   organizing the first set of recommendations based on a characteristic of an input stream of the plurality of input streams providing each recommendation of the first set of recommendations and a context of each recommendation of the first set of recommendations; and
   based on the organizing, causing the first set of recommendations to be displayed.

9. The method of claim 8 further comprising:
   organizing the second set of recommendations based on the characteristic of the input stream of the set of input streams providing each recommendation of the first set of recommendations, the context of each recommendation of the first set of recommendations, and a status of the input stream as an input stream of the set of input streams.

10. The method of claim 1, wherein the set of input streams is a second set of input streams, the first set of recommendations is generated from a first set of input streams of the plurality of input streams with the second set of input streams being a subset of the first set of input streams, and the second set of recommendations includes at least one recommendation from a third set of input streams not selected for inclusion in the second set of input streams, the method further comprising:
    assigning a weight to each recommendation of the second set of recommendations based on an input stream of the set of input streams providing the recommendation;
    determining a frequency of presentation for each recommendations of the second set of recommendations based on the weight of each recommendation;
    determining a position of presentation for each recommendation of the second set of recommendations based on the weight of each recommendation and the frequency of presentation; and
    causing presentation of the second set of recommendations based on the frequency of presentation and the position of presentation for each recommendation of the second set of recommendations.

11. The method of claim 10, wherein input streams in the second set of input streams have a greater weight than input streams in the third set of input streams.

12. A system comprising:
    a generation module comprising a hardware processor and configured to generate a first set of recommendations from a plurality of input streams, each input stream of the plurality of input streams corresponding to a selection algorithm, and a second set of recommendations;
    a receiver module configured to receive, from a user interface, one or more selections of recommendations from the first set of recommendations;
    a selection module configured to select a set of input streams corresponding to the one or more selections of recommendations from the plurality of input streams, the set of input streams being a subset of the plurality of input streams and corresponding to a subset of selection algorithms, the second set of recommendations being based on the set of input streams, and the second set of recommendations excluding at least a portion of the first set of recommendations generated using input streams excluded from the set of input streams; and a presentation module configured to cause presentation of the first set of recommendations and the second set of recommendations on the user interface.

13. The system of claim 12, wherein the receiver module is further configured to receive a query indicative of an interaction session, and wherein the first set of recommendations is generated in response to the query.

14. The system of claim 13, wherein the set of input streams is a second set of input streams and the first set of recommendations is generated from a first set of input streams of the plurality of input streams with the second set of input streams being a subset of the first set of input streams, and wherein the selection module is configured to determine one or more input stream of the plurality of input streams for inclusion in the first set of input streams corresponding to a predetermined selection of at least one of a characteristic of the one or more input stream, a characteristic of the query, and a user interaction.

15. The system of claim 13 further comprising:
a determination module configured to determine a session intent based on the one or more selections of recommendations from the first set of recommendations.

16. The system of claim 15, wherein the determination module is further configured to determine the session intent based on a characteristic of the query.

17. A non-transitory machine-readable storage medium comprising processor executable instructions that, when executed by a processor of a machine, cause the machine to perform operations comprising:
generating a first set of recommendations from a plurality of input streams, each input stream of the plurality of input streams corresponding to a selection algorithm;
causing presentation of the first set of recommendations on a user interface of a user device;
receiving one or more selections of recommendations from the first set of recommendations;
determining a session intent based on the one or more selections of recommendations from the first set of recommendations;
selecting a set of input streams, from the plurality of input streams, corresponding to the one or more selected recommendations and the session intent, the set of input streams being a subset of the plurality of input streams and corresponding to a subset of selection algorithms;
generating a second set of recommendations using the set of input streams based on the selections of recommendations, the second set of recommendations excluding at least a portion of the first set of recommendations generated using input streams excluded from the set of input streams; and causing presentation of the second set of recommendations on the user interface of the user device.

18. The non-transitory machine-readable storage medium of claim 17 wherein the operations further comprise:
receiving a query indicative of an interaction session; and
generating the first set of recommendations in response to the query.

19. The non-transitory machine-readable storage medium of claim 18, wherein the set of input streams is a second set of input streams and the first set of recommendations is generated from a first set of input streams of the plurality of input streams with the second set of input streams being a subset of the first set of input streams, and wherein selecting the second set of recommendations further determines one or more input streams of the plurality of input streams for inclusion in the first set of input streams corresponding to a predetermined selection of at least one of a characteristic of the one or more input stream, a characteristic of the query, and a user interaction.

20. The non-transitory machine-readable storage medium of claim 17, wherein the set of input streams is a second set of input streams, the first set of recommendations is generated from a first set of input streams of the plurality of input streams with the second set of input streams being a subset of the first set of input streams, and the second set of recommendations includes at least one recommendation from a third set of input streams not selected for inclusion in the second set of input streams, and the operations further comprise:
assigning a weight to each of the recommendations of the second set of recommendations based on an input stream providing the recommendation;
determining a frequency of presentation for recommendations of the second set of recommendations based on the weight of each recommendation;
determining a position of presentation for recommendations of the second set of recommendations based on the weight of each recommendation and the frequency of presentation; and
causing presentation of the second set of recommendations on the user interface of the user device based on the frequency of presentation and the position of presentation for each recommendation of the second set of recommendations.

* * * * *